3,451,342
CRYOGENIC ENGINE SYSTEM AND METHOD
Everett H. Schwartzman, 457 34th St.,
Manhattan Beach, Calif. 90266
Filed Oct. 24, 1965, Ser. No. 504,349
Int. Cl. F04b *17/00;* F03g *7/06*
U.S. Cl. 103—43
6 Claims

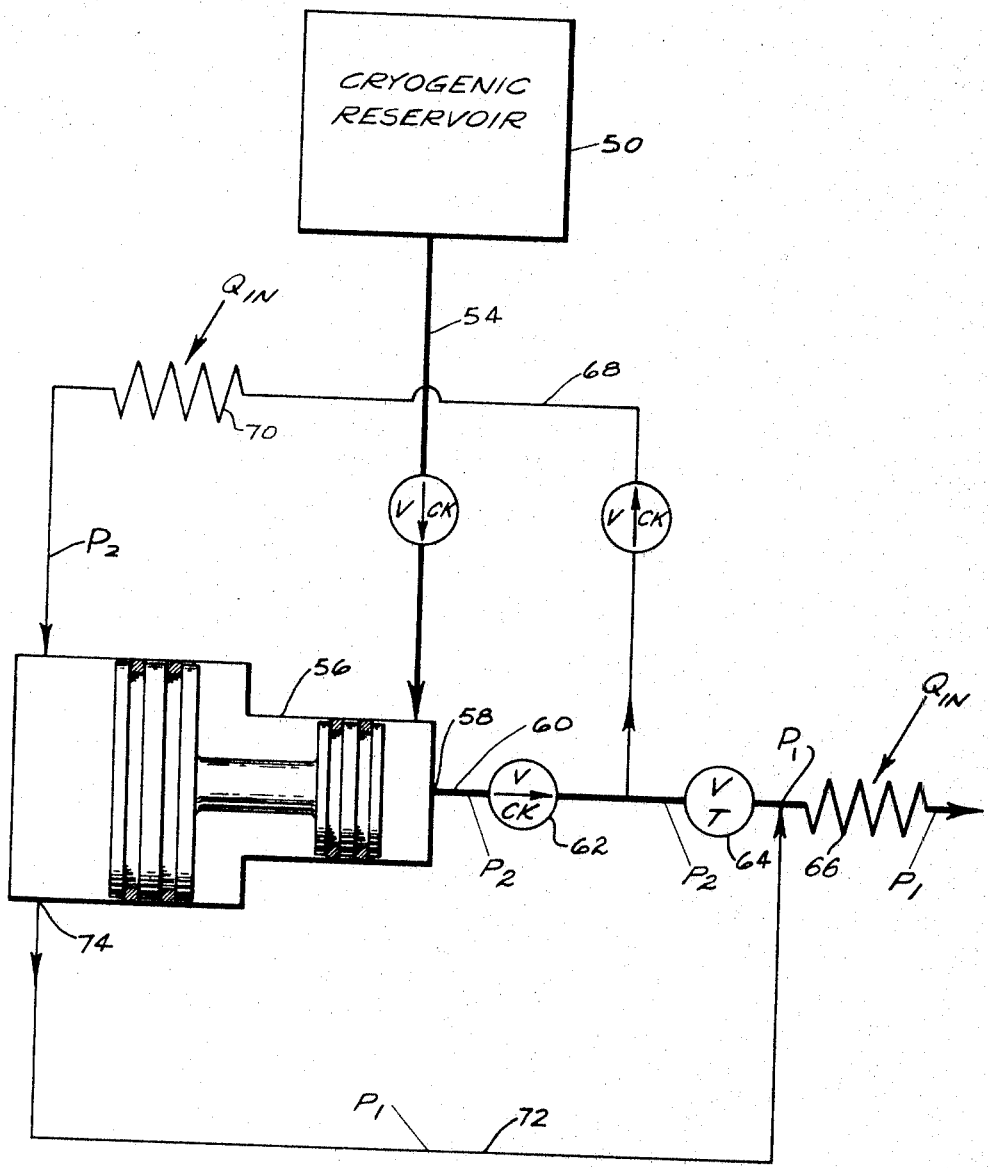
FIG_3

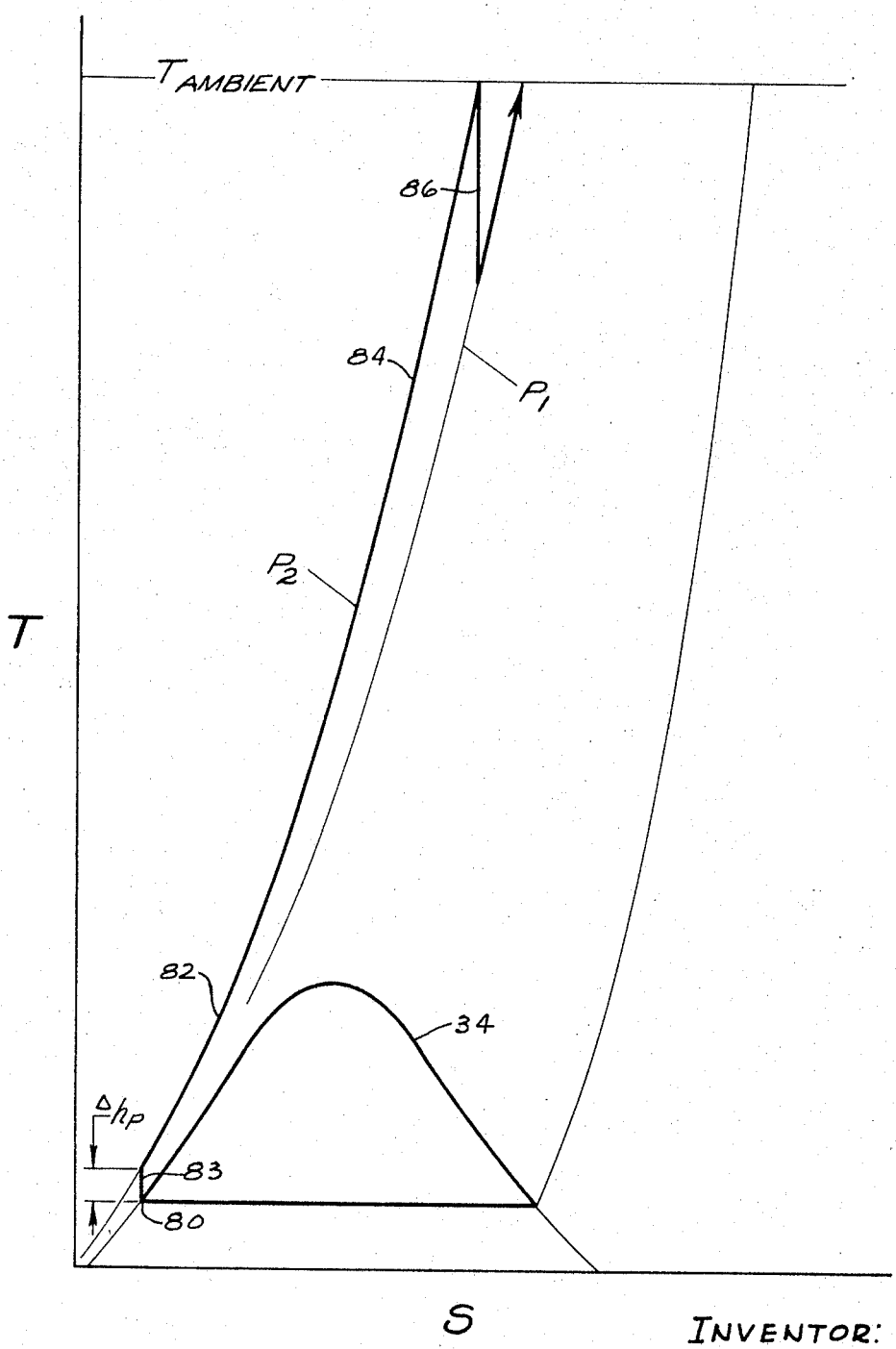
FIG-4-

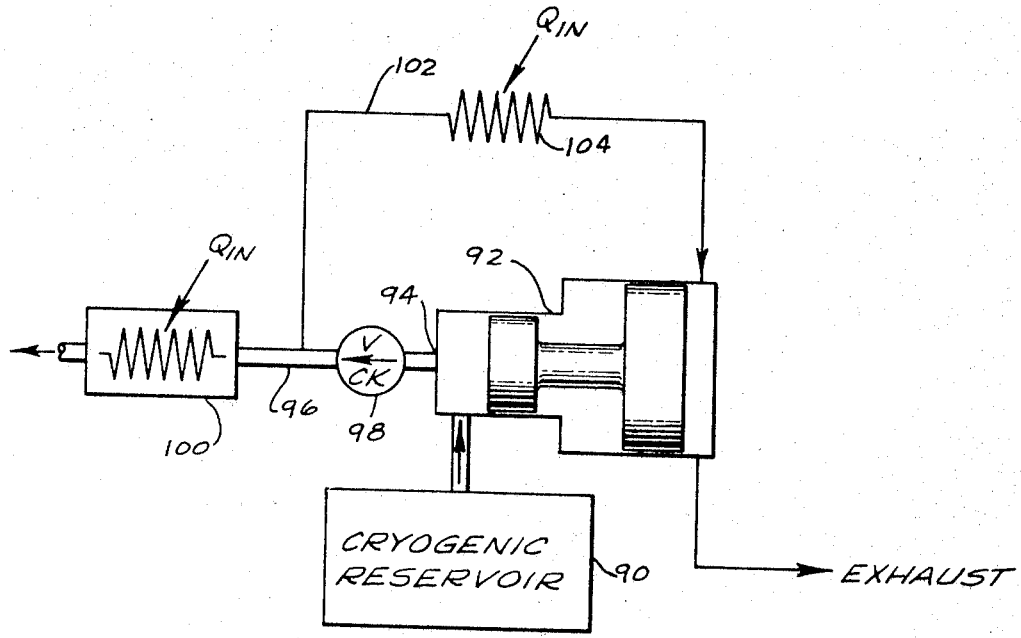
FIG_5_
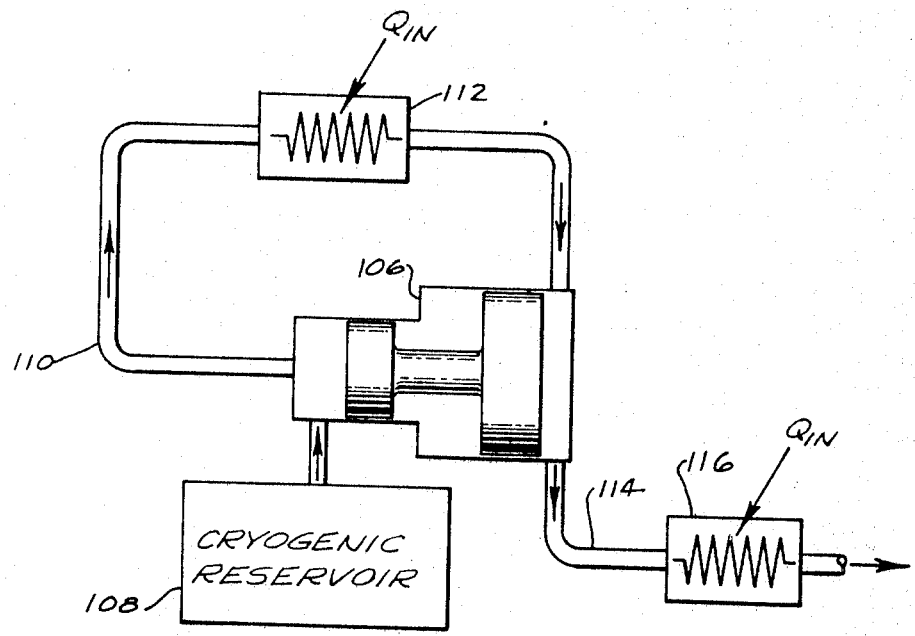
FIG_6_

ABSTRACT OF THE DISCLOSURE

A system is disclosed for converting the energy potential in a reservoir of cryogenic fluid into work, e.g., mechanical drive energy. A liquid gas reservoir is coupled through a pump to an expansion engine, e.g., a turbine. Heat exchanger means is then placed between the pump and the engine to expand the liquid gas by receiving heat (as from ambient) for application to the expansion engine, and the production of work, during which the gas is cooled. The expansion engine is disclosed to be connected to a transfer pump which is employed to deliver liquid gas from the reservoir.

---

This invention relates generally to thermodynamic systems and more particularly to engines which convert thermal energy into mechanical work.

It is often required, in modern technology, that a machine be provided which supplies mechanical work in an environment which includes a reservoir of cryogenic fluid and a source of heat such as, for example, the atmosphere or some other relatively massive body having a noncryogenic temperature.

A very typical example of such a required machine might be a fluid pump for transferring the cryogenic fluid from its container to another receptacle or to a utilization device. Because this example is validly typical and because the invention finds particularly useful application in the field of such pumps, much of the following discussion of examples and principles of operation of the invention are, in the cause of brevity and clarity, directed thereto. It is to be expressly understood however, that the advantages of the invention are considered equally well manifest in other fields of application, as will become apparent to the reader skilled in these arts.

In accordance with the best of the known prior art techniques, when it is desired to transfer cryogenic fuel as, for example, from a supply tank to a rocket engine, an electrically energized pump is utilized to pump the fluid. The practice of course requires a source of electrical power or, alternatively, requires the drain therefrom of energy which may be, in many cases such as compact earth-isolated capsules or the like, in critically short supply or be, in other respects, an extremely expensive source of energy.

The primary object of the invention is, therefore, to provide a cryogenic engine system and method which are not subject to these and other disadvantages.

It is another object to provide such a system which in many applications is powered by energy which is normally discarded or wasted.

It is another object to provide such a system which achieves highly useful magnitudes of work rates, while exhibiting exceedingly high levels of energy conversion efficiency.

It is another object to provide such a system which does not utilize combustion and therefore neither suffers the dangers and difficulties of achieving high efficiencies with chemical reactions nor requires a supply of chemical ingredients, such as oxygen, for the combustion process.

It is another object to provide such a system which does not require any external work input.

Very briefly, these and other objects and advantages are achieved in accordance with the structural features of one example of the invention which includes a source of liquid gas which is coupled, through a pump, to an expansion engine such as a turbine. Intermediate the pump and the engine is disposed a heat exchanger by which the liquified gas is expanded by virtue of absorbing heat from the atmosphere. The expanded fluid is cooled again by doing work in the rotary turbine.

The turbine may be connected to the machine requiring the mechanical energy such as a transfer pump for conveying the cryogenic fluid from, for example, its reservoir to a rocket engine.

The expanded and recooled fluid which has been used to run the driving turbine may be added downstream to the flow of the fluid to the rocket engine. Thus no significant mass of fluid has been spent in accomplishing the desired work; the only cost has been a slight lowering of the total temperature potential, often useless anyway, of the cryogenic mass with respect to the source of heat used to expand the fluid.

It may be readily appreciated that in many applications, this so called potential has no value and normally is simply discarded; accordingly it follows that the practical cost of pumping the cryogenic fluid in the above example is zero.

The principle of the invention exploited as in the above example is, therefore, that if an engine is placed between a source of heat and a heat sink, the thermal potential energy may be converted in the engine to mechanical work.

The efficiency of such an engine in the Carnot cycle limit is $$\text{Eff.} = 1 - \frac{T_{cold}}{T_{hot}}$$

Using ambient air at 520° R. (Fahrenheit degrees above absolute zero) as the heat source and a cryogenic fluid as the heat sink, the following Carnot efficiencies can be obtained: For liquid air or nitrogen, 73%; for liquid hydrogen, 93%; and for liquid helium, 99%. It may be noted that these figures compare with 76% for a convenional jet engine on the same basis, while the latter requires oxygen (or large masses of air) and involves the process of combustion with all its complex problems and disadvantages.

Further details of these and other novel features and their principles of operation, as well as additional objects and advantages of the subject cryogenic engine will become apparent and be best understood from a consideration of the following description taken in connection with the accompanying drawings which are all presented by way of illustrative example only and in which:

FIGURE 3 is a schematic diagram of an alternative example of the invention;

FIGURE 4 is a T–S diagram relating to the operation of the system of FIGURE 3; and FIGURE 5 and FIGURE 6 are schematic diagrams of additional examples of thermally energized engine systems constructed in accordance with the invention.

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made herein to show structural details of the apparatus in more detail than is necessary for a fundamental understanding of the invention, the description taken with the drawings making apparent to those skilled in the fields of thermodynamics and the mechanical arts how the several forms of the invention may be embodied in practice.

Specifically, the detailed showing is not to be taken as a limitation upon the scope of the invention which is defined by the appended claims forming, along with the drawings, a part of this specification.

Figure 1:
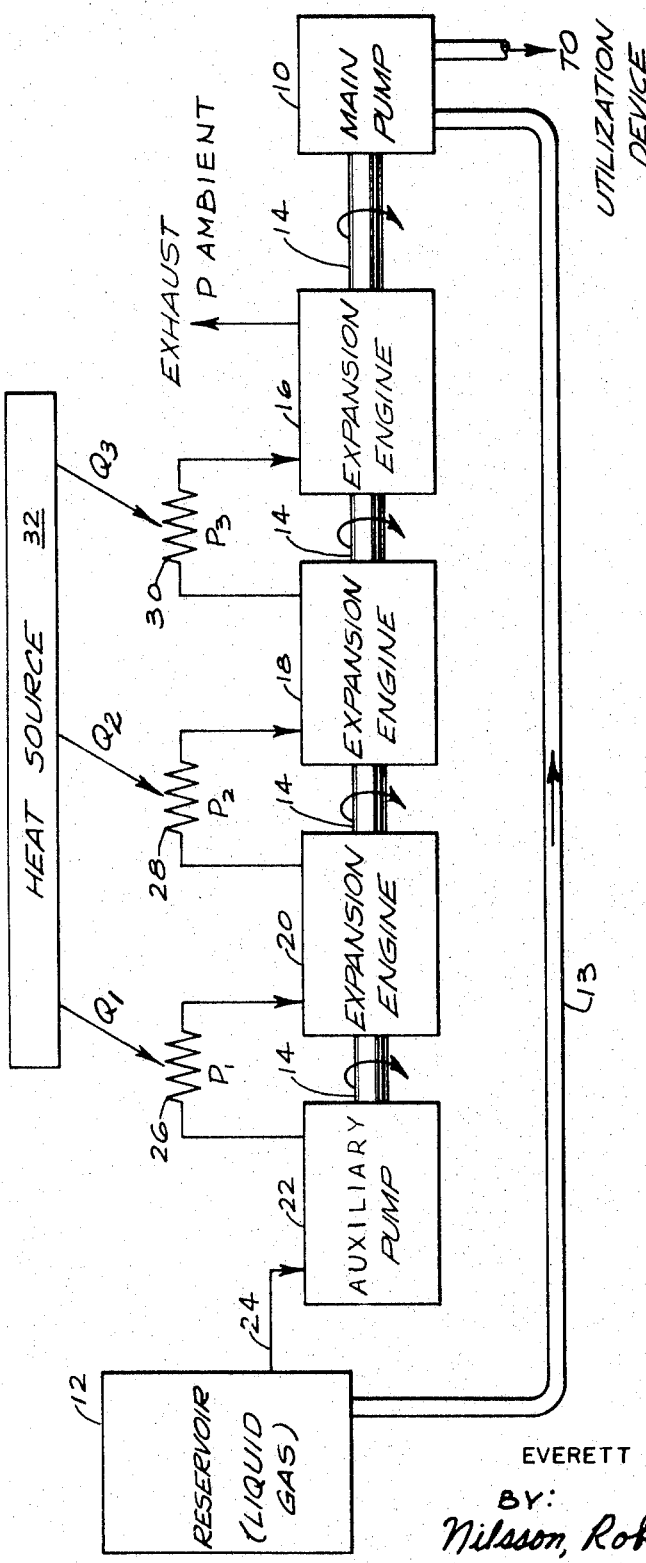
FIGURE 1 is a schematic diagram illustrating one example of a cryogenic engine system constructed in accordance with the principle of the present invention.

Referring to FIGURE 1, the example shown is that of a cryogenic engine system to be utilized in driving a main cryogenic pump 10 for forcing liquified gas from a reservoir 12 through a supply duct 13 to a utilization device, not shown.

The motive power for the pump 10 is supplied via a common shaft 14 which, in this example interconnects the pump with three expansion engines 16, 18, 20, and with an auxiliary pump 22. The reservoir 12 is also coupled to the input port of the auxiliary pump 22 by way of a cryogenic fuel supply line 24.

The output port of the pump 22 is connected through a first heat exchanger 26 to the input port of the first expansion engine 20. Similarly, the output port of the engine 20 is connected through a second heat exchanger 28 to the input port of the second expansion engine 18; and the output port of the engine 18 is connected through a third heat exchanger 30 to the third expansion engine 16. The output port of the third engine may be open to the atmosphere or may, when desired, for example, be coupled to the indicated utilization device.

The expansion engines may be of a turbine or reciprocating piston or other known type of gas driven machine.

Each of the heat exchangers 26, 28, 30 is thermally coupled in energy exchange relationship to a source of heat 32 which may be a stream of air in the atmosphere or other fluid, a source of heat radiation, or the like. The heat exchangers of the appropriate character to provide the desired thermal interaction; for example, when the heat source is a flow of ambient temperature air from the atmosphere, the heat exchangers are conductive walled coils through which the cryogenic fluid is drawn and over which the warm air flows. The qualities $Q_1$, $Q_2$, $Q_3$ indicate the direction and magnitude of heat flow from the source 32 into respective ones of the exchangers 26, 28, 30 during prescribed periods of time discussed below in connection with the subsequent figures.

Figure 2:
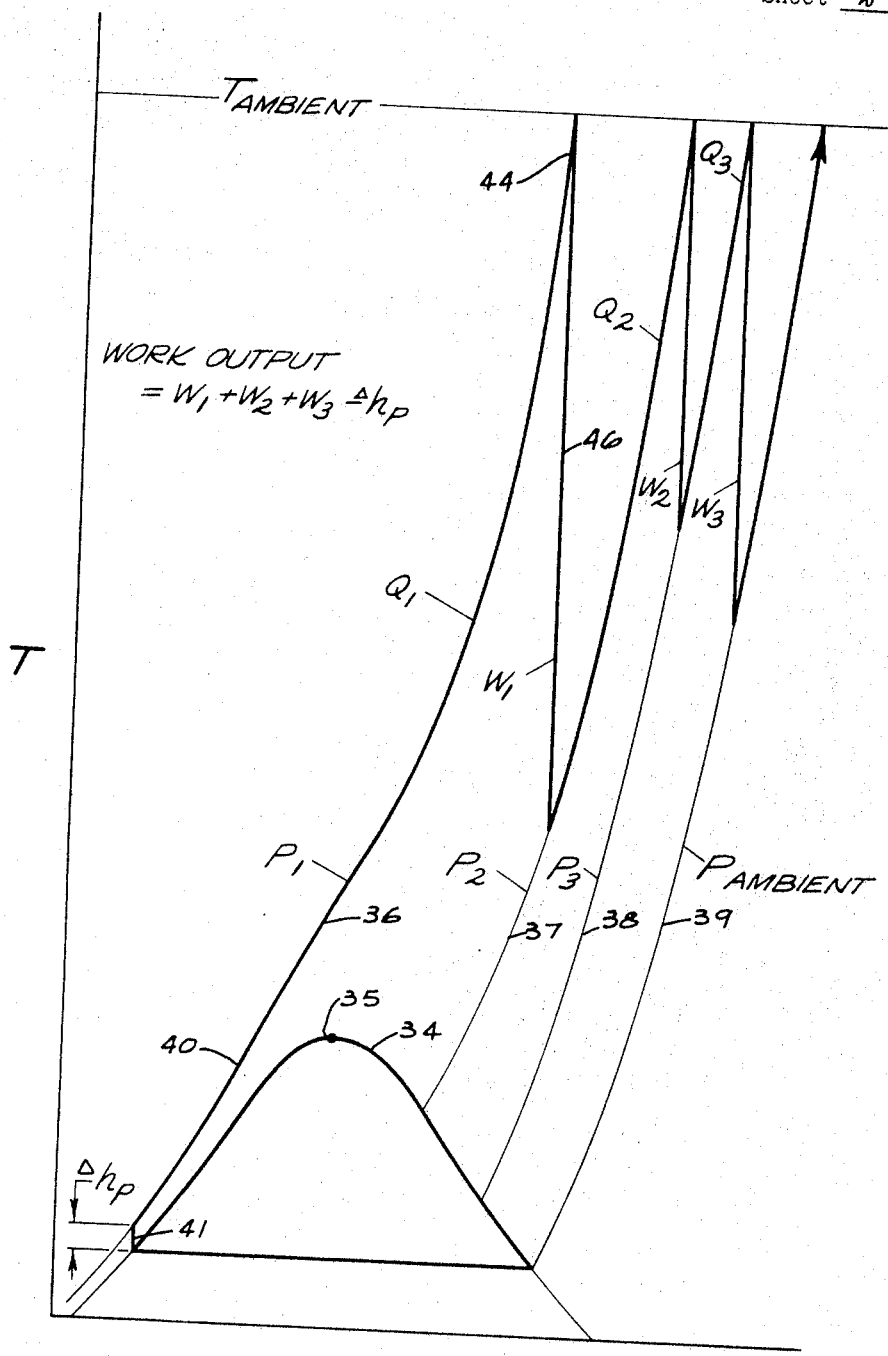
FIGURE 2 is a temperature-entropy (T–S) diagram for describing the operation of the structure of FIGURE 1.

Referring now to FIGURE 2, a conventional T–S diagram for a particular substance presents temperature on the ordinate as a function of entropy on the abscissa. The region under the "dome" 34 represents quantities of the substance in mixed liquid-gaseous phase in equilibrium with the usual "critical point" indicated at 35. The curves 36, 37, 38, 39 indicate plots of constant pressure for a given mass of the substance for varying temperatures and entropies. In particular, with reference again to FIGURE 1, the curves 36, 37, 38, 39 correspond to $P_1$, $P_2$, $P_3$, $P_{ambient}$, respectively, where: $P_1$ is the pressure of the substance between the auxiliary pump 22 and the first expansion engine 20; $P_2$ is the pressure of the substance between the expansion engines 20 and 18; $P_3$ is the pressure between the expansion engines 18 and 16; and $P_{ambient}$ is the pressure of the substance after it is exhausted from the third expansion engine 16.

A curve 40 plots the status of a specific mass quantity of the cryogenic fluid as it is drawn from the reservoir 12 through the fuel supply line 24, through the auxiliary pump 22, and the sequence of heat exchangers and expansion engines to the system "exhaust." At the left hand, minimum entropy and 41 of the curve 40, a quantity of energy indicated as delta $h$ is added to the substance in drawing it from the reservoir 12, through the auxiliary pump 22, and into the first heat exchanger 26. This step of the process raises the pressure of the substance to $P_1$ and causes it to progress across the mixed phase portion 42 of the $P_1$ curve.

The substance then passes, at pressure $P_1$, through the first heat exchanger 26 wherein by the absorption of $Q_1$, its temperature is raised to approximately $T_{ambient}$ as indicated by the elongated portion 44 of the curve 40. The substance is then sent through the first expansion turbine, or engine 20, wherein the substance undergoes a fast expansion, performing, thereby, a quantity of work $W_1$ on the common shaft 14, and suffers thereby a substantially isentropic cooling as indicated by the portion 46 of the curve 40.

The substance then passes through the second heat exchanger 28 wherein it is again expanded at constant pressure along the $P_2$ curve 37 until it again reaches, substantially, $T_{ambient}$ absorbing the quantity of heat $Q_2$ in the process. The substance is then passed through the second expansion engine 18 wherein it suffers a second isentropic, substantially, cooling while performing a quantity of work $W_2$ on the shaft 14.

Finally, the substance is again heated, along the $P_3$ curve 38 absorbing $Q_3$ until approximately $T_{ambient}$ is reached. Then again it is permitted to expand in the engine 16 adding the work $W_3$ to the shaft. The substance is then, in this example, permitted to disperse into the atmosphere.

Then it may be seen that the work output, performed on the shaft 14 of the main pump 10 is equal to $W_1+W_2+W_3-$delta $h$; and the magnitude of work available from $W_1+W_2+W_3$ is clearly, from the curve 40, much greater than delta $h$ because the energy extracted in expanding the gas after the total of the Q's has been added is greater than that absorbed by the substance in pumping it in its liquid state through the auxiliary pump 22. The remainder, or surplus energy, is then available as shaft horsepower for energizing the main pump 10 or other utilization apparatus.

It may be noted that this work is available even without oxygen or combustion or without in any way tapping its chemical potential energy. If, for example, the cryogenic substance is submarine fuel, such as hydrogen and, separately, oxygen, the cryogenic thermal potential energy may be utilized for auxiliary and motive purposes and then combined chemically to extract the maximum total energy from the substance. The cryogenic engine thus conserves or utilizes energy which would otherwise be discarded.

Referring to FIGURE 3, an example of the invention is illustrated in which the novel cryogenic engine system is utilized to pump liquid from a cryogenic reservoir 50, convert the liquid to a pure gas at high pressure, and supply it to a utilization device 52.

In this example, the thermal potential between an ambient, warm environment and the cryogenic heat sink represented by the mass of the liquified gas, is converted by the engine into mechanical energy to accomplish the work required for the transferring process.

The reservoir 50 is coupled through a duct 54 to the high pressure, work output end of a pump represented schematically in the figure by the small area end of a reciprocating piston pump 56. The high pressure output port 58 is connected via a main supply duct 60 through a check valve 62, a throttle valve 64, and a vaporizer heat exchanger 66 to the utilization device.

Part of the cryogenic substance is coupled off the supply duct 60 at the high pressure $P_2$, between the check valve 62 and the throttle valve 64, and is supplied through a fuel line 68, including a heat exchanger 70, to the low pressure, large area, work input end of the pump 56.

The fuel exhaust line 72 then connects the lower pressure $P_1$ port 74 to the lower pressure $P_1$ side of the throttle valve 64. The sum combination then of the mass flow at higher pressure, initially $P_2$, through the throttle valve 64 with that at lower pressure $P_1$ through the work input end of the pump 56 then passes through the vaporizer heat exchanger 66 at pressure $P_1$ to the utilization device 52.

In a practical example of the system shown in FIGURE 3, the desired output to the device 52 was a large mass flow at 6000 p.s.i. The high pressure output of the pump 56 was maintained at 6100 p.s.i. and approximately one-half of the total high pressure output of port 58 was fed back to run the pump which suffered a pressure drop of approximately 100 p.s.i. in performing the required mechanical work. The exhausted mass was then added to the low pressure side of the differential producing throttle valve 64 and the total mass sent on toward the utilization device. The pressure differential across the valve 64 was, of course, also approximately 100 p.s.i.

Thus a high volume high pressure pure gas source is provided which is entirely self-contained and requires no external work input, other than the energy inherently drawn from the ambient environment.

In FIGURE 4, the T–S diagram illustrates graphically, as in FIGURE 2, the thermodynamic traversal thereacross of a quantity of the cryogenic substance which leaves the reservoir 50 at point 80 on the curve 82, undergoes an amount of work delta $h$ at the portion 83 while going through the high pressure end of the pump 56, traverses the mixed phase region of the curve, and undergoes a relatively extensive warming in the exchanger 70 at constant pressure $P_2$ along the portion 84 of the curve 82. When the substance has been warmed to approximately $T_{ambient}$, it is sent through the low pressure, work input end of the pump 56 which step is shown by the approximately isentropic expansion portion 86 of the curve 82. The substance is then exhausted from the pump at the port 74 at the pressure $P_1$.

Obviously, because of the greater delta T of the portion 86 of the curve 82 with respect to that of the portion 83, expanding the gas after adding the $Q_{in}$ at the exchanger 70 gives much more work output per unit of mass than that absorbed by the pump in pumping the same amount of liquid.

Referring to FIGURE 5 an example of the invention is illustrated which is similar to that of FIGURE 3 except that the cryogenic fluid is pumped from the reservoir 90 to a utilization device, not shown, by the small area, work output, end of a pump 92, shown again very schematically. The output port 94 is connected to a supply duct 96 and passes through a check valve 98. Optionally, depending upon the phase and temperature desired at the utilization device, a vaporizer or heat exchanger 100 may be interposed, as shown, in the output supply duct 96.

At the output end of the check valve 98, when used, a fuel supply line 102 may tap off a small supply of the cryogenic fuel, feed it through a warming heat exchanger 104, and permit it to expand and cool while doing work in the work input end of the pump 92. The fuel gas is permitted to expand fully to the ambient pressure of the environment and is then exhausted thereto as indicated.

In this example, some of the pumped fluid is completely vaporized and discarded; however, because of the complete expansion and heating of this portion of gas, the amount of "fuel" needed is many times less than that required for the previous system.

One further embodiment of the invention is illustrated in FIGURE 6 wherein a pump 106 of the general character of the previous examples is utilized to pump cryogenic fluid from a reservoir 108 through a supply duct 110, the high pressure work output end of the pump 106, a heat exchanger 112, the lower pressure work input end of the pump 106, and an output supply duct 114 to the utilization device, not shown. As in the previous example, a heat exchanger vaporizer 116 may be interposed in the output line when desired.

There have thus been disclosed and discussed a number of examples of cryogenic engine systems which exhibit the advantages and achieve the objects set forth hereinabove.

What is claimed is:

1. Cryogenic engine system for converting the thermal energy potential between a reservoir of cryogenic fluid and an ambient environment, the system comprising:
   drawing means connected to the reservoir for drawing the cryogenic fluid therefrom;
   a plurality of heat exchangers connected to said drawing means and thermally coupled to the ambient environment for conveying said fluid in heat absorbing relation with respect to said environment; and
   a like plurality of expansion engines for permitting the expansion of said fluid while extracting energy therefrom intercoupled in a cascaded series with one of said exchangers being connected between adjacent ones of said expansion engines.

2. A cryogenic engine system for providing mechanical energy from the thermal energy of a reservoir of cryogenic fluid, comprising:
   an expansion engine means for cooling received fluid during expansion in the performance of mechanical work;
   a heat exchanger means for supplying the heat of ambient temperature to fluid therein; and
   means for cycling said cryogenic fluid from said reservoir through said expansion engine means as a gas and said heat exchanger means in a closed flow path whereby energy is removed from said fluid as mechanical work from said expansion engine means and heat is supplied to said fluid by said heat exchanger means subsequent to said fluid passing through said expansion engine means.

3. The invention according to claim 2 which further includes a common work accumulating shaft intercoupling said plurality of expansion engines.

4. The invention according to claim 3 in which said drawing means comprises an auxiliary pump interconnected in fluid communication between said reservoir and one of said heat exchangers and mechanically connected to said common shaft for taking work therefrom.

5. Cryogenic engine system for pumping cryogenic fluid from a reservoir to a utilization device, the system being disposed in thermal energy interchange relation with an environment at an ambient temperature and comprising:
   engine-pump means having a higher pressure work output section and a lower pressure work input section, said reservoir being connected to said work output section of said engine-pump means; and
   heat exchanger means intercoupled in fluid communication between said higher pressure and lower pressure section for conveying a predetermined quantity of said fluid therebetween in thermal energy absorption relationship with respect to said environment.

6. The invention according to claim 5 which further includes a system output duct; a pressure differential throttling valve intercoupled between said output duct and said higher pressure work output section of said engine-pump means; and fluid connecting means for connecting said lower pressure work input section to said output duct.

References Cited

UNITED STATES PATENTS

| | | | |
|---|---|---|---|
| 230,323 | 7/1880 | Molera et al. | 60—26 |
| 984,585 | 2/1911 | McHenry | 60—26 |
| 1,002,768 | 9/1911 | Shuman | 60—26 |
| 1,101,001 | 6/1914 | Willsie | 60—26 |
| 1,119,063 | 12/1914 | Burnap | 60—26 X |

FOREIGN PATENTS

| | | |
|---|---|---|
| 484,305 | 6/1917 | France. |
| 615,351 | 10/1926 | France. |
| 23,624 | 10/1911 | Great Britain. |
| 221,203 | 1925 | Great Britain. |
| 282,773 | 7/1929 | Great Britain. |
| 657,020 | 9/1951 | Great Britain. |
| 435,720 | 5/1948 | Italy. |

MARTIN P. SCHWADRON, *Primary Examiner.*

ROBERT R. BUNEVICH, *Assistant Examiner.*

U.S. Cl. X.R.

60—26, 36; 62—402